United States Patent [19]

Huhman

[11] Patent Number: 4,672,981

[45] Date of Patent: Jun. 16, 1987

[54] AXIAL FLOW CYLINDER CAGE WITH NONPERFORATED PORTION ABOVE THE FEEDER OPENING

[75] Inventor: Michael L. Huhman, Kansas City, Mo.

[73] Assignee: Deutz-Allis Corporation, Milwaukee, Wis.

[21] Appl. No.: 861,137

[22] Filed: May 8, 1986

[51] Int. Cl.⁴ .............................................. A01F 12/00
[52] U.S. Cl. .................................. 130/27 R; 56/14.6; 130/27 E
[58] Field of Search ............ 56/14.6; 130/27 R, 27 B, 130/27 E, 27 AB, 27 P, 27 H, 27 Q, 27 S

[56] References Cited

U.S. PATENT DOCUMENTS

| | | | |
|---|---|---|---|
| 3,410,270 | 11/1968 | Herbsthofer | 130/27 R |
| 3,430,633 | 3/1969 | Mark | 130/27 R |
| 4,117,849 | 10/1974 | Rakosh | 56/14.6 |
| 4,458,697 | 7/1984 | James | 56/14.6 |
| 4,498,483 | 2/1985 | Dammann | 56/14.6 |
| 4,564,025 | 7/1986 | Dammann | 56/14.6 |
| 4,610,127 | 9/1986 | Eguchi et al. | 56/14.6 |

FOREIGN PATENT DOCUMENTS 2102664 2/1983 United Kingdom ............ 130/27 R

Primary Examiner—Robert Peshock
Assistant Examiner—John G. Weiss
Attorney, Agent, or Firm—Charles L. Schwab

[57] ABSTRACT

An axial flow combine receives a crop material through a radial feeder opening at one axial end of a foraminous cage in which a coaxial rotor rotates. The cage is disposed within a processor housing and threshed material passing through the radial openings in the cage is accelerated downwardly to the cleaning section by accelerator rolls at the bottom of the processor housing. A portion of the space within the processor housing above the feeder opening is closed off in a unique manner to prevent threshed material from entering the area directly above the feeder opening and to divert threshed material passing through perforations in the cage near the closed-off space axially inward so it slides and falls downward alongside the feeder housing to the accelerator rolls. An overfeed auger is eliminated and a portion of the cage above the feeder opening is solid rather than perforated thus reducing the initial cost of the combine and maintenance expenses without significant reduction in harvesting capacity.

9 Claims, 3 Drawing Figures

AXIAL FLOW CYLINDER CAGE WITH NONPERFORATED PORTION ABOVE THE FEEDER OPENING

BACKGROUND OF THE INVENTION

This invention relates to an axial flow combine in which crop material is fed into a cylindrical foraminous cage through a radial feeder opening at one of its axial ends where it is threshed by a rotor having rasp bars. As threshing occurs, the crop material is moved by helical bars on the inside of the cage to a radial discharge opening adjacent the other axial end of the cage.

U.S. Pat. No. 4,108,150 issued on Aug. 22, 1978 to J. L. Shaver on an Agitator for an Axial Flow Cylinder shows a foraminous cage which has radial threshing openings in the cylindrical cage wall except for the feeder opening and the discharge opening. Material passing through small radial openings in the cage above the feeder opening and gravitating downwardly fell into a trough and an auger conveyed the material inward to a central point where it was discharged and fell to distribution augers and, thence, to accelerator rolls. The provision of an overfeed auger and its drive train adds to the initial cost of the combine and requires the usual service and maintenance to keep it in a good operating condition.

In one combine of the before-mentioned type, the perforated cage sections above the feeder opening were replaced by cylindrical nonperforated sections. These nonperforated sections were the width of the feeder opening and extended from the top of the feeder opening to the top of the horizontally disposed cylindrical cage. Also, the cylindrical trough and the overfeed auger were eliminated with a resulting vertical opening between the cage and the processor housing directly above the feeder conveyor. Since the cage was not perforated above the feeder opening, crop material did not pass through that part of the cage and threshing capacity was reduced. The air turbulence within the processor housing caused a substantial quantity of separated crop material to pass downwardly through the vertical opening onto the feeder conveyor, thus causing undesirable recycling of some separated crop material.

OBJECTS AND SUMMARY OF THE INVENTION

An important objective of this invention is elimination of the overfeed auger with minimum loss of threshing capacity and avoidance of rethreshing of separated crop material.

A further object is the meeting of the foregoing objective plus improving product cost and reliability, and reducing maintenance expense.

An axial flow combine incorporating this invention can be summarized as including a processor housing with top, front and rear walls and laterally spaced side walls, a cylindrical cage within the processor housing extending axially between the side walls in spaced relation to the top, front and rear walls and having radial openings permitting passage of threshed material including seed, a rotor coaxially mounted within the cage on a generally horizontal axis, a radial feeder opening in the lower front half of the cage extending axially from one side wall a predetermined distance to a laterally inner edge, a longitudinal feeder housing with a vertical longitudinal side wall generally aligned with and having a rear end terminating at the inner edge of the feeder opening, and a partition wall structure between the cage and the processor housing closing off a portion of the space in the housing disposed above the feeder opening. The partition wall structure extends from the one side wall an axial distance substantially less than the predetermined distance to a point at the top of the cage and thence extends to the vertical longitudinal side wall of the feeder housing. The cage area encompassed by the one side wall, the partition wall structure and the top edge of the feeder opening is void of radial threshing openings.

BRIEF DESCRIPTION OF THE DRAWINGS

One embodiment of the invention is illustrated in the drawings in which.

DETAILED DESCRIPTION OF THE DRAWINGS

Figure 1:
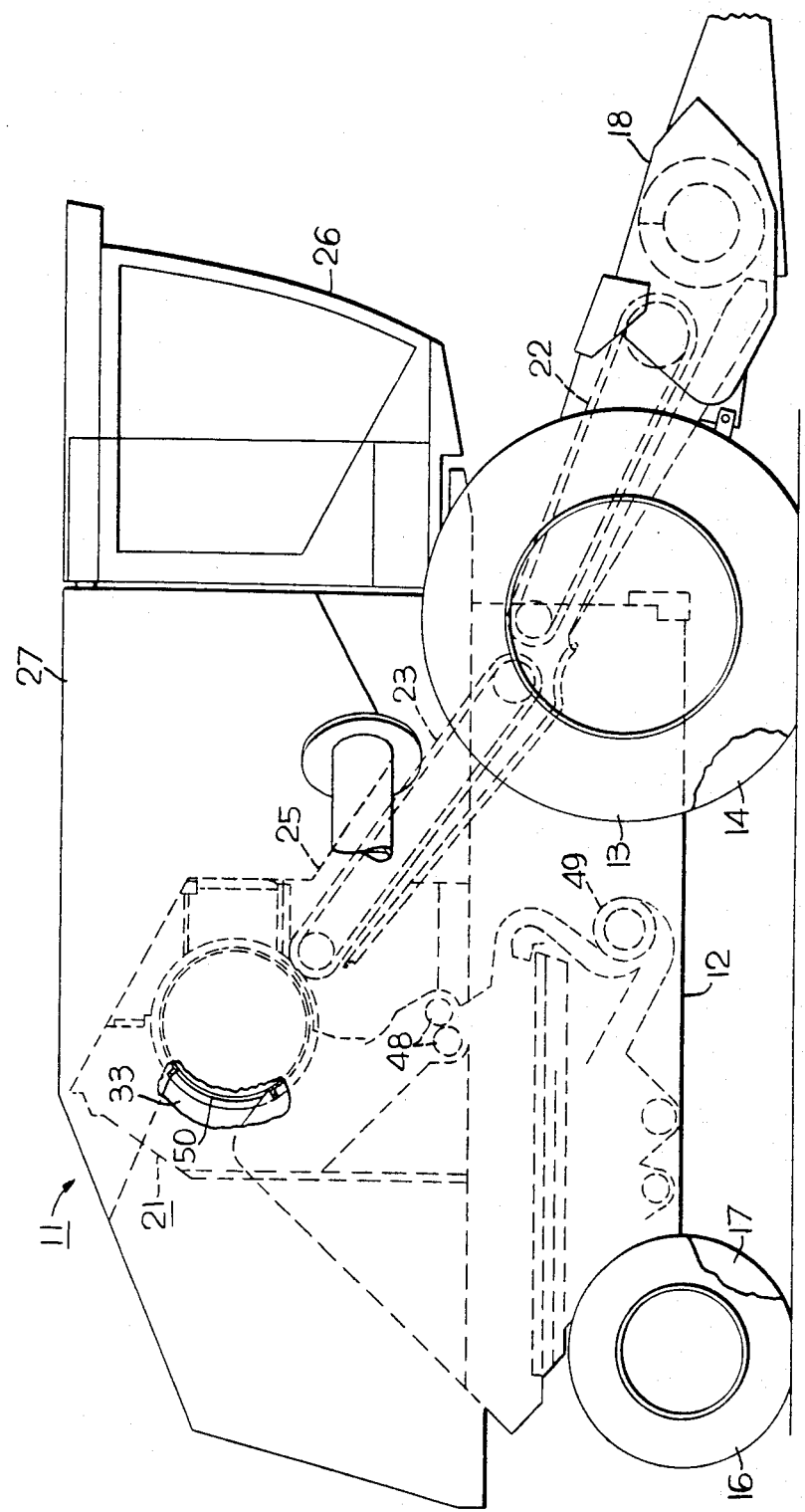
FIG. 1 is a right-hand side view of a combine with parts broken away for illustration purposes.

Referring to FIG. 1, the combine 11 incorporating the present invention includes a main frame 12 supported at its front by a pair of drive wheels 13, 14 and at its rear by a pair of steerable wheels 16, 17. A header 18 mounted on the front of the main frame 12 severs crop material which is conveyed to the processor section 21 by end-to-end feeder conveyors 22, 23. An operator's station 26 is mounted on the main frame 12 in front of a grain bin 27.

Figure 2:
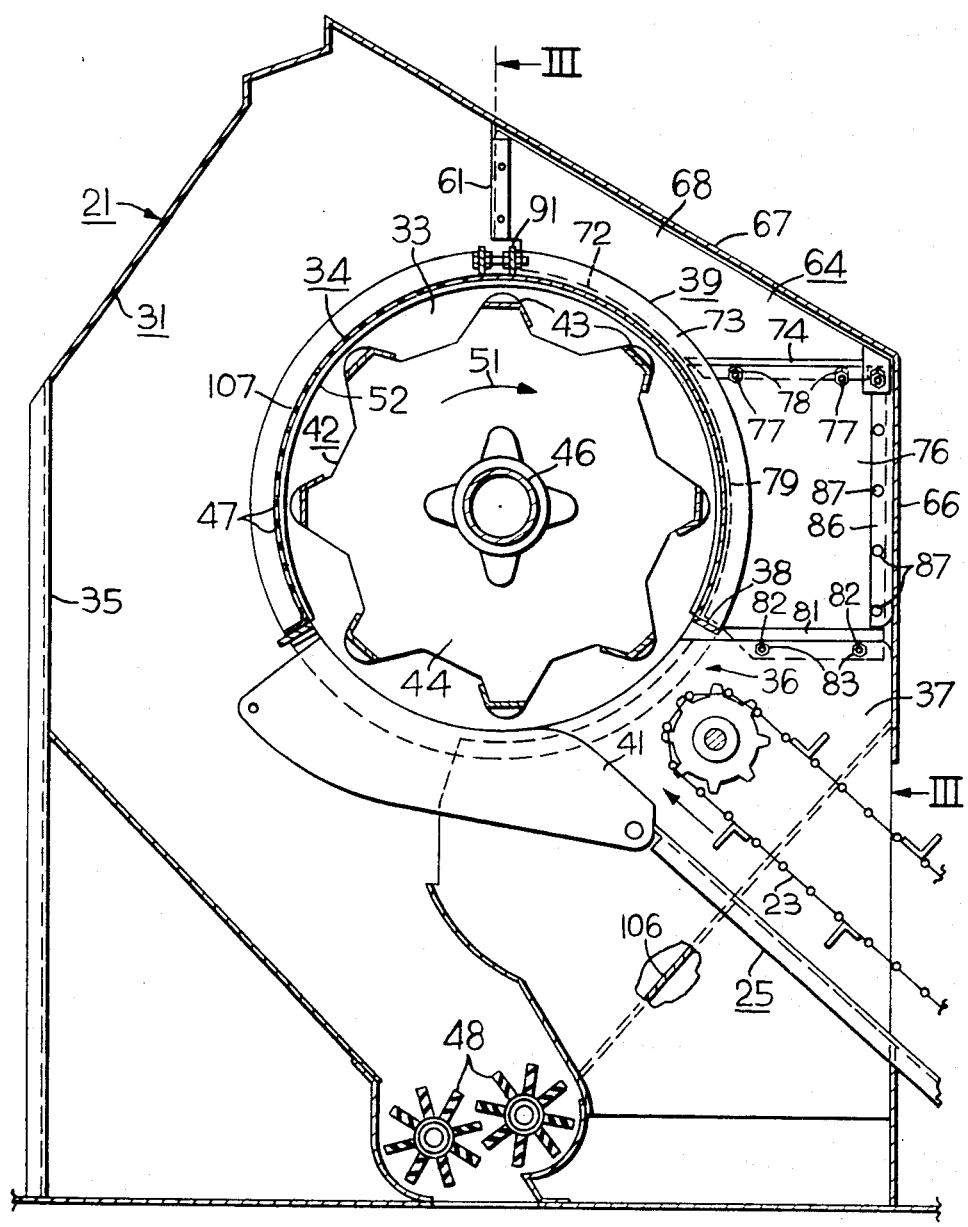
FIG. 2 is a section view of the processor section of the combine taken on a vertical longitudinal plane.
Figure 3:
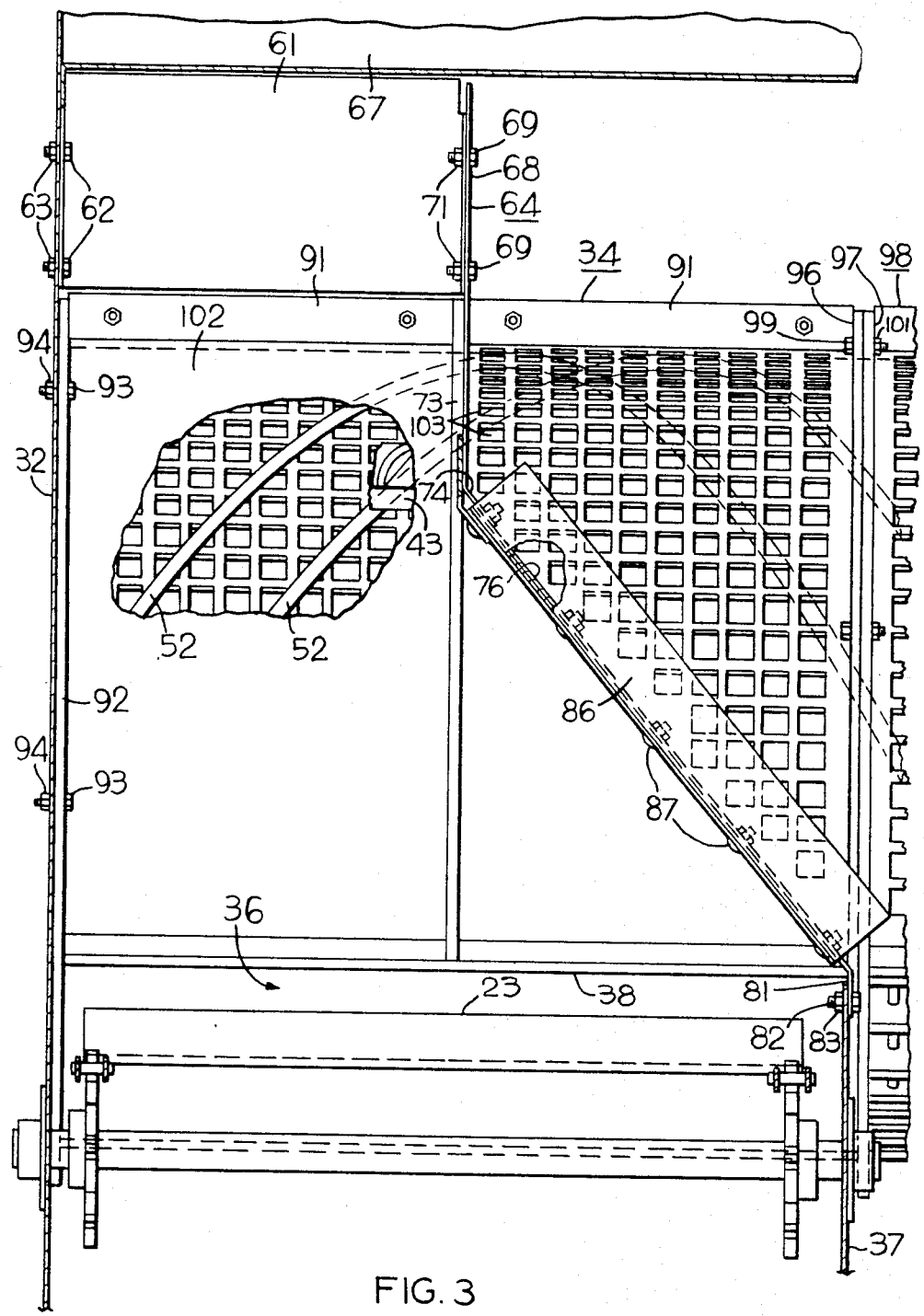
FIG. 3 is a section taken along line III—III in FIG. 2.

Referring also to FIGS. 2 and 3, the processor 21 includes a processor housing 31 which has a rear wall 35, a front wall 66 and a top wall 67. Additionally, the processor housing includes side walls 32, 33 to which a cylindrical foraminous threshing cage 34 is secured. Crop material is delivered through a conveyor housing 25 by the upper conveyor 23 to a feeder opening 36, the lateral edges of which are defined by the processor side wall 32 and a longitudinal vertical side wall 37 of the conveyor housing 25 and the top and bottom edges of which are defined by the lower flange 38 of a cage segment 39 and a combined concave and rock door structure 41. The conveyor housing 25 is aligned with and connected to the feeder opening 36. Crop material fed through the feeder opening 36 is acted upon by a threshing rotor 42 rotatably supported on the side walls 32, 33 by bearings, not shown. The rotor 42 includes circumferentially spaced and axially extending rasp bars 43 secured to axially spaced radial hubs 44 which in turn are secured to the rotor shaft 46. Threshed material passing through the radial openings 47 in the cage 34 slide and fall downwardly to a pair of accelerator rolls 48 which accelerate the threshed material downwardly through a rearwardly directed air stream produced by a transverse fan 49.

Rotation of the rotor 42 in the direction of arrow 51, shown in FIG. 2, causes the crop material to move across the concave structure 41 and then upwardly and around the interior of the cage 34. Helical ribs 52 secured to the interior of the cage causes the crop material to move axially to the right, as viewed in FIG. 3, in a spiral or helical path around the interior of the cage as the crop material is impacted by the rasp bars 43 of the rotor 42. The crop material which does not pass through radial threshing openings in the cage 34 are discharged through a radial discharge opening 50, as shown in FIG. 1, which is located adjacent the side wall 33.

In order to prevent threshed material from entering the housing space above the feeder opening 36, and thus recycling, the space in the processor housing 31 between the input opening and the top of the cage 34 is walled off from the remaining space in the housing 31 and the walled off portion of the cage above the feeder opening 36 is void of radial threshing openings. The closing off of the space above the feeder opening is achieved by providing a partition wall structure 64 which includes a vertical transverse partition wall 61 having one lateral end rigidly secured to the side wall 32 by bolts 62 and nuts 63. The partition wall structure 64 also includes a partition wall 68 extending circumferentially forwardly and downwardly from the laterally inner end of the partition wall 61 and an inclined partition wall 76. The top partition wall 61 extends vertically between the uppermost part of the cage 34 to the top wall 67 of the housing 31 and extends axially along the top of the cage 34 a distance equal to about one-half the lateral width of the feeder opening 36, terminating in a flange rigidly secured to a vertical and longitudinally disposed partition wall 68 of the wall structure 64 by bolts 69 and nuts 71. The top of the partition wall 68 is closely adjacent to or abuts the underside of the top wall 67 of the housing 31 and the lower edge 72 of the partition wall 68 is curved to be complementary and adjacent to the exterior of the cage on the lateral side of a reinforcing flange 73 remote from the side wall 32. The lower edge 72 terminates vertically above and in line with the top of the feeder opening 36. The bottom of the partition wall 68 includes a bent horizontal part 74 extending horizontally forward the end of lower edge 72 to which the top of a diagonal or inclined partition wall 76 of the wall structure 64 is secured by bolts 77 and nuts 78. The rear edge 79 of the inclined partition wall 76 is curved to be complementary and adjacent to the exterior of the cage 34 and a bent horizontal bottom part 81 of the partition wall 76 is secured to the longitudinal vertical side wall 37 of the conveyor housing 25 at the level of the top of the feeder opening 36 by bolts 82 and nuts 83. A seal strip 86 made from flat flexible material is secured to the front end of the diagonal partition wall by bolts 87 and nuts 88. The seal strip bends 90 degrees and sealingly engages the rear side of the processor housing front wall 66.

The segment 39 of the cage 34 above the cage inlet or feeder opening 36 is approximately the same width as the feeder opening and extends from a transversely and vertically extending top flange 91 approximately 120 degrees to its bottom flange 38 which is the top edge of the feeder opening 36. The cage segment 39 includes a radial flange 92 at its outer end which is rigidly secured to the side wall 32 by bolts 93 and nuts 94 and a radial flange 96 at its laterally inner end which is rigidly secured to a radial flange 97 of an adjacent cage segment 98 by bolts 99 and nuts 101. The portion of the cylindrical wall 102 of the cage segment 39 lying within the space walled off or enclosed by the partition walls 61, 68 and 76 is solid and not perforated. The portion of the cylindrical wall 102 of the cage segment 39 outside the space walled off from the rest of the interior of the processor housing 31 by the partition walls 61, 68, 76 is perforated and contains radial threshing openings 103 through which threshed material leaves the interior of the cage 34. During a harvesting operation, the threshed material passing through the radial threshing openings 103 of the segment 39 will slide and fall by gravity down the outside of the perforated portion of the cage wall 102 and will be conveyed by the inclined partition wall 76 axially to the inboard side of the longitudinal vertical side wall 37 of the feeder conveyor housing 25 where it falls and slides down the lower front housing wall 106 to the accelerator rolls 48. The cage segment 107 at the rear of the feeder opening 36 is perforated and is secured at its top to the cage segment 39 by adjustable nut and bolt fastening means.

This invention eliminates the need for the overfeed auger previously employed above the feeder opening and threshed material passing through the radial threshing openings of the cage cannot fall onto the feeder conveyor 23. A minimum area of the cage has been made nonforaminous. The crop material fed through the feeder opening 36 to the rotor 42 is moved axially inward by the spiral or helical ribs 52 so that very little crop material is swept across the closed or solid portion of the wall 102 of the cage segment 39. Accordingly, there is very little reduction in the harvesting capacity of a combine using the present invention as compared to a combine having a fully perforated cage segment above the feeder opening and using an overfeed auger. By the time the incoming crop material has reached the top of the interior of the cage it will have been shifted axially inward from the side wall 32 approximately one-half the axial width of the feeder opening. As the crop material is then moved downwardly and forwardly from the top of the interior of the cage, the spiral ribs 52 will shift the crop material to the inboard side of the conveyor housing. Thus, the structure of this invention is designed to cause the crop material to pass across radial threshing openings throughout its passage through the processor 21.

The embodiments of the invention in which an exclusive property or privilege is claimed are defined as follows:

1. An axial flow combine comprising:
    a processor housing including top, front and rear walls and laterally spaced side walls,
    a cylindrical cage within said processor housing extending axially between said side walls, said cage being spaced from said top, front and rear walls and having radial openings permitting passage of threshed material including seed,
    a rotor coaxially mounted within said cage for rotation about a generally horizontal axis,
    a radial feeder opening in the lower front half of said cage extending axially from one of said side walls a predetermined distance to a laterally inner edge,
    a longitudinal feeder housing with a vertical longitudinal side wall generally aligned with and having a rear end terminating adjacent to said inner edge of said feeder opening,
    a partition wall structure between said cage and said processor housing closing off a portion of the space in said housing disposed above said feeder opening, said wall structure extending from said one side wall an axial distance substantially less than said predetermined distance to a point at the top of said cage and thence extending to said vertical longitudinal side wall of said feeder housing,
    said cage being void of radial openings in the area thereof closed off by said partition wall structure.

2. The combine of claim 1 wherein said partition wall structure terminates at said vertical longitudinal side wall of said conveyor housing at the vertical level of the top of said feeder opening.

3. The combine of claim 1 wherein said partition wall structure includes a vertical partition wall extending upwardly between the top of said cage and said top wall and extending axially along the top of said cage between said one wall and said point.

4. The combine of claim 3 wherein said partition wall structure includes an inclined partition wall sloping downwardly toward said vertical longitudinal side wall of said conveyor housing.

5. The combine of claim 4 wherein said inclined partition wall terminates at said vertical longitudinal side wall of said conveyor housing at the vertical level of the top of said feeder opening.

6. The combine of claim 3 wherein said partition wall structure includes a vertical longitudinal wall extending circumferentially forward from said point to a position on said cage approximately above the upper edge of said feeder opening and terminating in a horizontal edge in line with said position and includes an inclined partition wall extending between said horizontal edge and said vertical horizontal side wall.

7. The combine of claim 1 wherein said cage includes helical threshing bars secured to its interior and operable in cooperation with said rotor upon the rotation of the latter to move crop material fed through said feeder opening to said cage axially away from said one side wall.

8. An axial flow combine comprising:
- a processor housing including top, front and rear walls and laterally spaced side walls,
- a cylindrical cage within said processor housing extending axially between said side walls in spaced relation to said top, front and rear walls and having radial threshing openings permitting passage of threshed material including seed,
- a rotor coaxially mounted within said cage for rotation about a generally horizontal axis,
- a radial feeder opening in the lower front half of said cage extending axially from one of said side walls a predetermined distance to a laterally inner edge,
- a longitudinal feeder housing aligned with said feeder opening with a vertical longitudinal side wall generally aligned with and terminating adjacent to said inner edge of said feeder opening, and
- a partition wall structure between said cage and said processor housing closing off a portion of the space in said housing disposed above said feeder opening, said wall structure extending from said one side wall an axial distance equal to about one-half of said predetermined distance to a point at the top of said cage and thence extending to said vertical longitudinal side wall of said feeder housing, the cage area encompassed by said one side wall, said partition wall structure and said top edge of said feeder opening being substantially void of radial threshing openings.

9. The combine of claim 8 wherein said cage includes helical threshing bars secured to its interior which upon rotation of said rotor function to move crop material in an axial direction away from said one side wall.

* * * * *